(12) United States Patent
Marshall

(10) Patent No.: US 11,583,019 B2
(45) Date of Patent: Feb. 21, 2023

(54) CHILD RESTRAINT ASSEMBLY

(71) Applicant: Pam Marshall, Lawndale, CA (US)

(72) Inventor: Pam Marshall, Lawndale, CA (US)

( * ) Notice: Subject to any disclaimer, the term of this patent is extended or adjusted under 35 U.S.C. 154(b) by 277 days.

(21) Appl. No.: 17/072,105

(22) Filed: Oct. 16, 2020

(65) Prior Publication Data

US 2022/0117338 A1  Apr. 21, 2022

(51) Int. Cl.
*A41F 9/00* (2006.01)
*A47D 13/08* (2006.01)

(52) U.S. Cl.
CPC .............. *A41F 9/00* (2013.01); *A47D 13/086* (2013.01)

(58) Field of Classification Search
CPC .......... A41F 9/00; A41F 9/005; A47D 13/086; A47D 13/046
See application file for complete search history.

(56) References Cited

U.S. PATENT DOCUMENTS

| | | | | |
|---|---|---|---|---|
| 903,761 A * | 11/1908 | Paroubek | ............. | A61F 5/0118 2/24 |
| 2,754,532 A * | 7/1956 | Kanehl | ................. | A41B 15/00 2/48 |
| 2,994,300 A | 7/1958 | Grahling | | |
| 3,063,718 A * | 11/1962 | Steinkamp | ............. | A63B 67/00 2/919 |
| 3,712,049 A * | 1/1973 | Luxembourg | ......... | G04B 43/00 368/286 |
| 4,667,624 A | 5/1987 | Smith | | |
| 4,688,564 A * | 8/1987 | Kelly | ................... | A47D 13/086 128/878 |
| 4,745,883 A | 5/1988 | Baggetta | | |
| 4,765,279 A | 8/1988 | Klickstein | | |
| 4,765,748 A * | 8/1988 | Fidalgo | ..................... | A63F 9/00 273/DIG. 30 |
| 5,069,168 A | 12/1991 | Roberson | | |
| 5,259,338 A * | 11/1993 | Cornell | .................. | A01K 27/00 297/484 |
| 5,423,292 A | 6/1995 | Hall | | |
| D383,256 S * | 9/1997 | Hampton | ..................... | D30/153 |
| 5,699,555 A | 12/1997 | Schunter | | |
| 5,797,142 A * | 8/1998 | Debronsky, Jr. | .......... | A45F 5/02 15/208 |
| 5,848,576 A | 12/1998 | Colaianni | | |
| 6,095,093 A * | 8/2000 | Kisko | ..................... | A01K 27/00 224/220 |
| 6,129,418 A * | 10/2000 | Bergh | ..................... | B62B 3/144 297/219.12 |
| 6,192,835 B1 * | 2/2001 | Calhoun | .............. | A01K 27/003 119/792 |
| 6,224,450 B1 * | 5/2001 | Norton | ....................... | B62J 1/16 446/28 |

(Continued)

*Primary Examiner* — Alissa L Hoey

(57) ABSTRACT

A child restraint assembly for inhibiting a child from wandering away from a caregiver includes a waist belt that is wearable around the waist of a caregiver. The waist belt has a plurality of connection points thereon being distributed along a full length of the waist belt. A strap is matable to a respective one of the connection points on the waist belt. A bell is coupled to the strap to emit an audible sound when the strap is moved. A wrist belt is coupled to the strap and the wrist is wearable around a wrist of a child when the strap is coupled to the waist belt. In this way the strap inhibits the child from moving away from the caregiver.

8 Claims, 5 Drawing Sheets

(56) References Cited

U.S. PATENT DOCUMENTS

| | | | | |
|---|---|---|---|---|
| D458,414 | S | 6/2002 | Major | |
| 6,553,944 | B1 * | 4/2003 | Allen | A01K 27/00 119/770 |
| 7,516,717 | B2 * | 4/2009 | David | A01K 27/00 119/857 |
| 7,900,586 | B2 * | 3/2011 | Hamblen | A47D 13/086 119/857 |
| 7,908,777 | B1 * | 3/2011 | Beardsley | B60N 2/28 40/586 |
| 8,205,579 | B2 * | 6/2012 | Pellei | A47D 13/086 119/857 |
| 8,322,311 | B2 * | 12/2012 | Gould | A01K 27/003 119/797 |
| 9,387,381 | B1 * | 7/2016 | Garces | A63B 69/00 |
| 11,185,051 | B2 * | 11/2021 | DeLuccia | A01K 27/003 |
| 2005/0217219 | A1 * | 10/2005 | Stark | B68B 7/00 54/19.1 |
| 2011/0023793 | A1 | 2/2011 | Marricle | |
| 2013/0082831 | A1 * | 4/2013 | Byrne | G08B 21/24 340/457 |

* cited by examiner

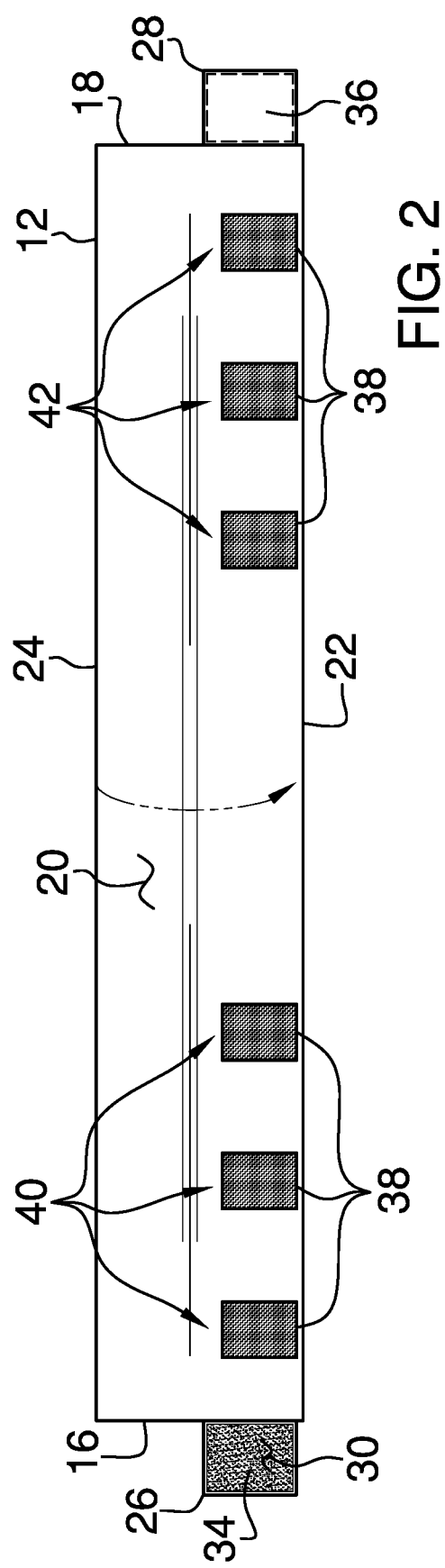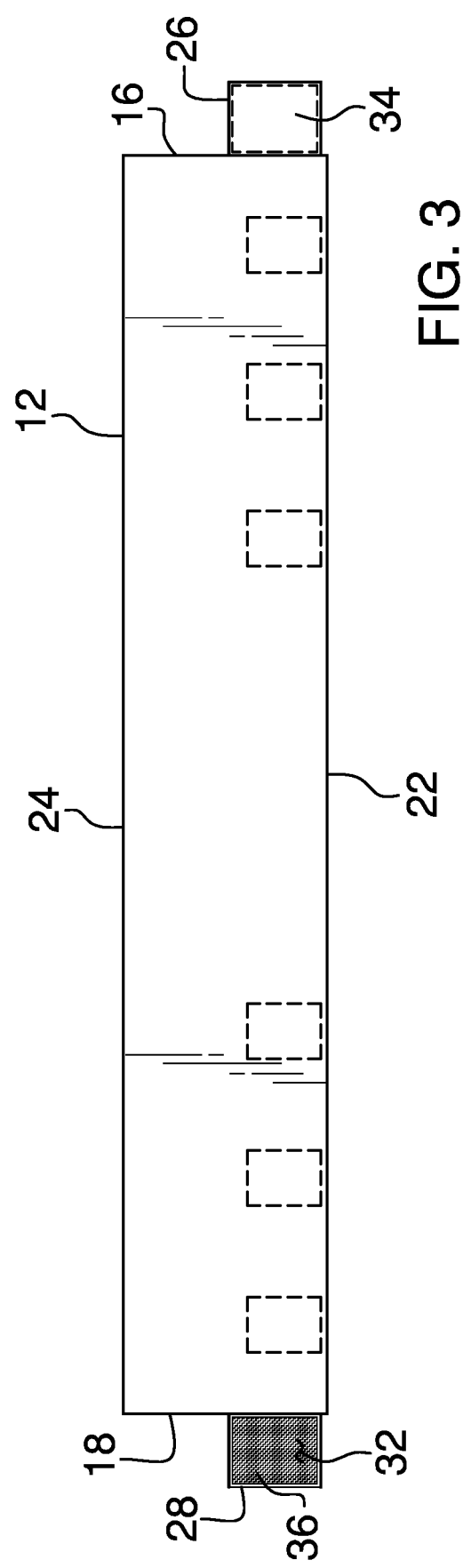

CHILD RESTRAINT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to restraint devices and more particularly pertains to a new restraint device for inhibiting a child from wandering away from a caregiver.

(2) Description of Related Art Including Information Disclosed Under 37 CFR 1.97 and 1.98

The prior art relates to restraint devices and the prior art discloses a coiled tether that is wearable between a caregiver's wrist and a child's wrist. The prior art discloses a waist belt which has a plurality of loops and a harness that is attachable to a respective one of the loops for inhibiting a child from wandering away from a caregiver. The prior art discloses an elastic strap which has a loop on each end for wearing around a child's wrist and a caregiver's wrist. Additionally, the prior art discloses a belt that has a pair of adjustable loops thereon for wearing between a child's wrist and a caregiver's wrist.

BRIEF SUMMARY OF THE INVENTION

An embodiment of the disclosure meets the needs presented above by generally comprising a waist belt that is wearable around the waist of a caregiver. The waist belt has a plurality of connection points thereon being distributed along a full length of the waist belt. A strap is matable to a respective one of the connection points on the waist belt. A bell is coupled to the strap to emit an audible sound when the strap is moved. A wrist belt is coupled to the strap and the wrist is wearable around a wrist of a child when the strap is coupled to the waist belt. In this way the strap inhibits the child from moving away from the caregiver.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a front view of an embodiment of the disclosure.

FIG. 3 is a back view of an embodiment of the disclosure.

DETAILED DESCRIPTION OF THE INVENTION

Figure 1:
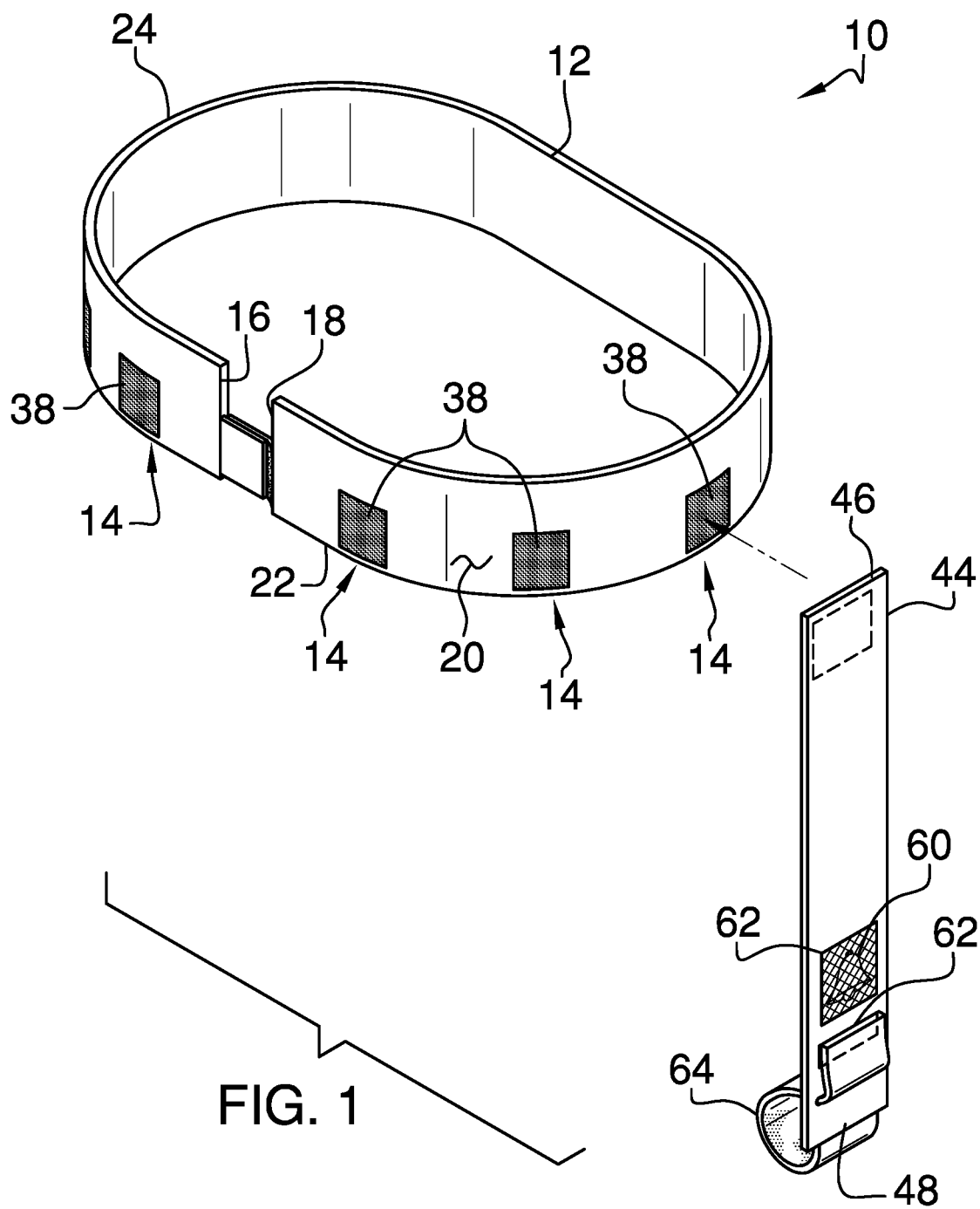
FIG. 1 is a perspective view of a child restraint assembly according to an embodiment of the disclosure.
Figure 4:
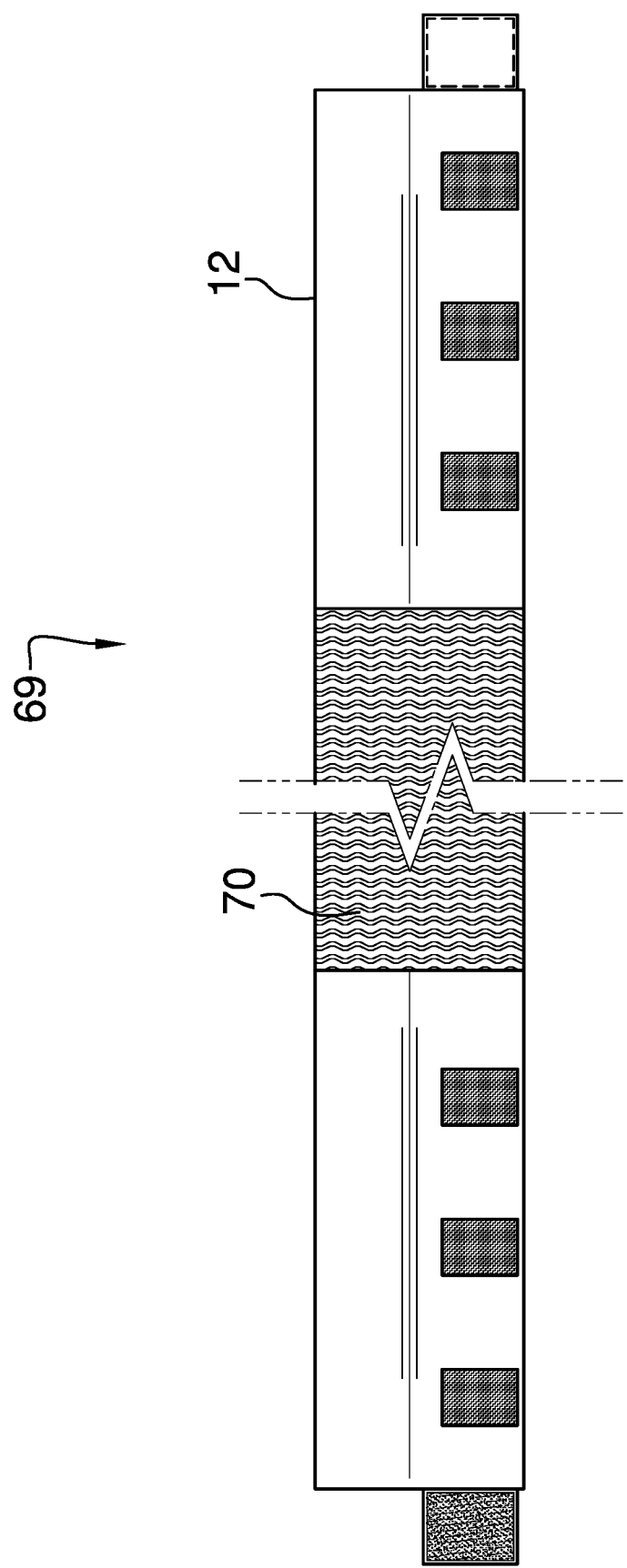
FIG. 4 is a front view of an alternative embodiment of the disclosure.
Figure 6:
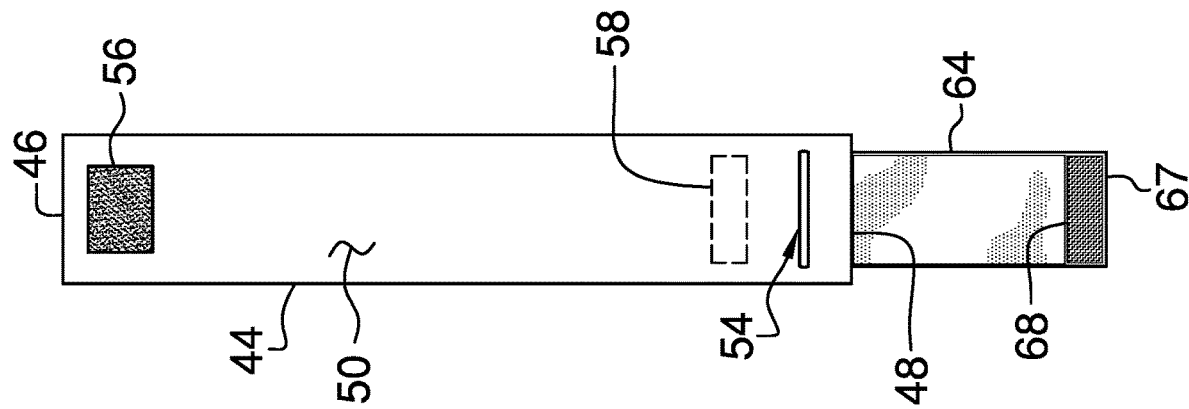
FIG. 6 is a back view of a strap and a wrist belt of an embodiment of the disclosure.
Figure 5:
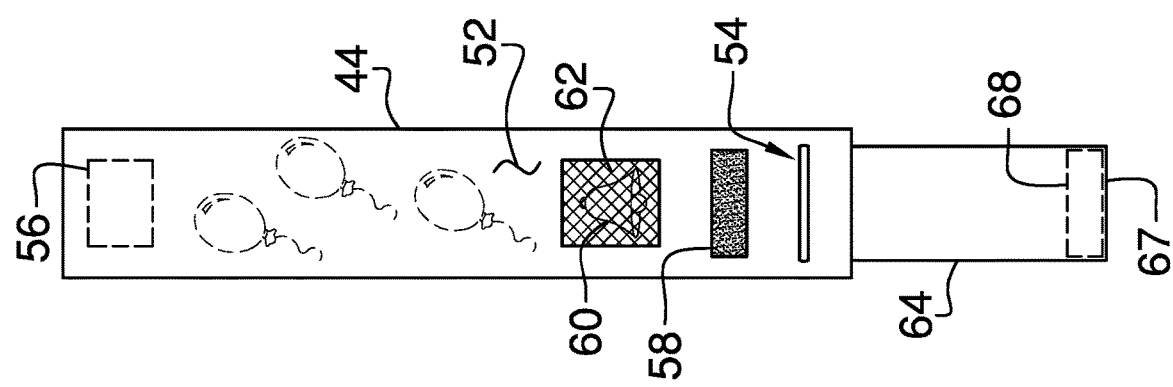
FIG. 5 is a front view of strap and a wrist belt of an embodiment of the disclosure.
Figure 7:
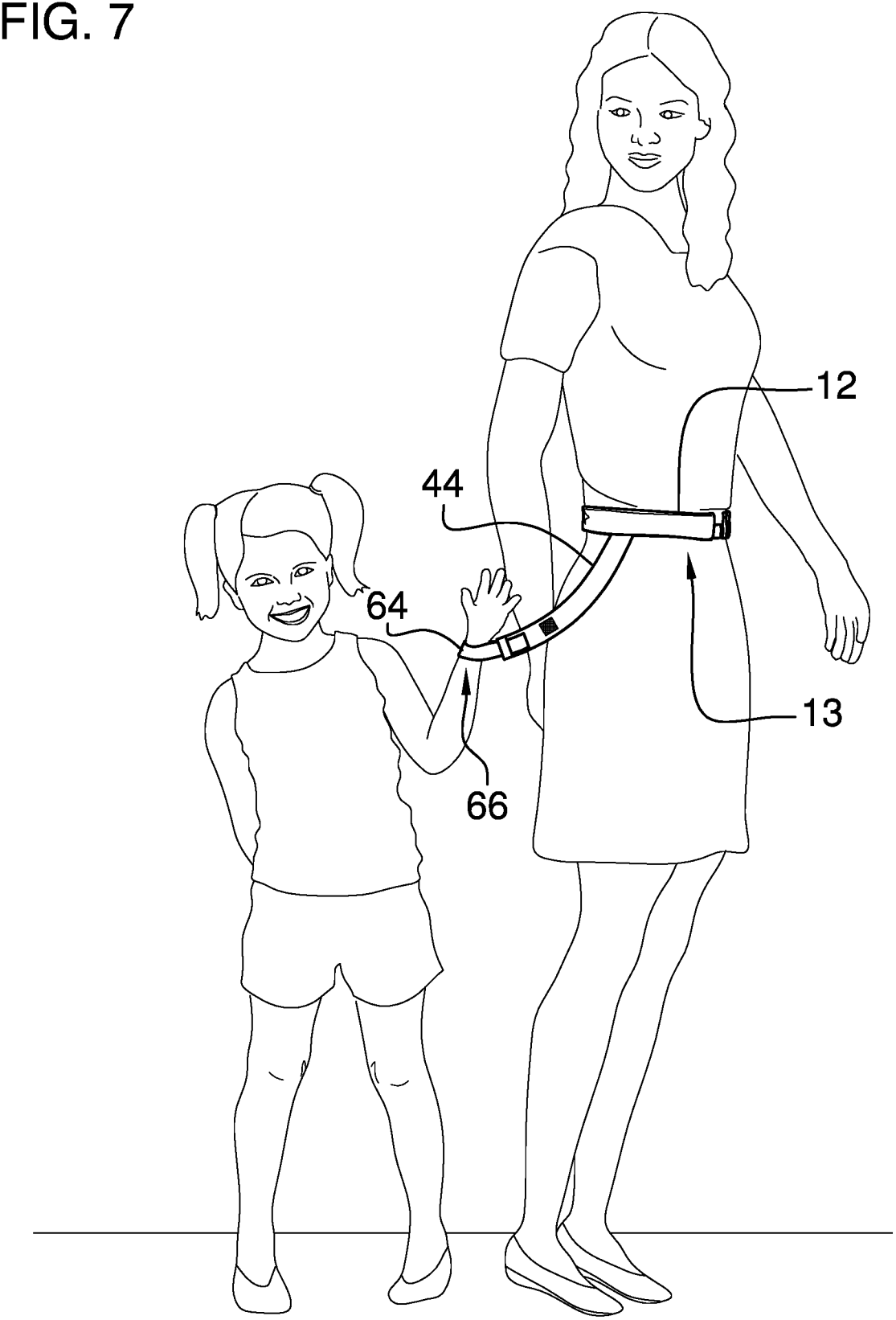
FIG. 7 is a perspective in-use view of an embodiment of the disclosure.

With reference now to the drawings, and in particular to FIGS. 1 through 7 thereof, a new restraint device embodying the principles and concepts of an embodiment of the disclosure and generally designated by the reference numeral 10 will be described.

As best illustrated in FIGS. 1 through 7, the child restraint assembly 10 generally comprises a waist belt 12 that is wearable around the waist 13 of a caregiver. The waist belt 12 has a plurality of connection points 14 thereon being distributed along a full length of the waist belt 12. The waist belt 12 has a first end 16, a second end 18 and a front surface 20 extending therebetween, and the waist belt 12 has a bottom edge 22 and a top edge 24. The first end 16 has a first tab 26 extending laterally away therefrom and the second end 18 has a second tab 28 extending laterally away therefrom. The first tab 26 is matable to the second tab 28 to form the waist belt 12 into a closed loop for retaining the waist belt 12 around the caregiver's waist 13.

The first tab 26 has a forward surface 30 and the second tab 28 has a rear surface 32. A first mating member 34 is coupled to the forward surface 30 of the first tab 26 and a second mating member 36 is coupled to the rear surface 32 of the second tab 28. Moreover, the first mating member 34 releasably engages the first mating member 34. Each of the first mating member 34 and the second mating member 36 may comprise a hook and loop fastener, complementary snaps or any other type of releasable, multiple use fastener.

A plurality of waist belt mating members 38 is provided and each of the waist belt mating members 38 is coupled to the front surface 20 of the waist belt 12. Each of the waist belt mating members 38 defines a respective one of the connection points 14 on the waist belt 12. Additionally, each of the waist belt mating members 38 is positioned adjacent to the bottom edge 22 of the belt. The plurality of waist belt mating members 38 includes a set of first waist belt mating members 40 and a set of second waist belt mating members 42. The first waist belt mating members 40 are distributed from the first end 16 toward the second end 18. The second waist belt mating members 42 are distributed from the second end 18 toward the first end 16. Each of the waist belt mating members 38 may comprise a hook and loop fastener, snaps or any other type of releasable, multiple use fastener.

A strap 44 provided that is matable to a respective one of the connection points 14 on the waist belt 12. The strap 44 has a primary end 46, a secondary end 48, a primary surface 50 and a secondary surface 52. The strap 44 has a slit 54 extending through the primary surface 50 and the secondary surface 52. The slit 54 is positioned adjacent to the secondary end 48 and the slit 54 is oriented to extend along a line that is oriented parallel to the secondary end 48.

A primary mating member 56 is coupled to the primary surface 50 of the strap 44 and the primary mating member 56 is matable to a respective one of the waist belt mating members 38. In this way the strap 44 can be retained on the waist belt 12. The primary mating member 56 is positioned adjacent to the primary end 46. A secondary mating member 58 is coupled to the secondary surface 52 of the strap 44 and the secondary mating member 58 is positioned adjacent to the slit 54 in the strap 44. Each of the primary mating member 56 and the secondary mating member 58 may comprise a hook and loop fastener, complementary snaps or any other type of releasable, multiple use fastener.

A bell 60 is coupled to the strap 44 to emit an audible sound when the strap 44 is moved. The bell 60 may be comprised of a rigid material and the bell 60 may include a striker for ringing the bell 60. A mesh layer 62 is coupled to the strap 44 such that the mesh layer 62 retains the bell 60 against the strap 44. A wrist belt 64 is coupled to the strap 44 and the wrist belt 64 is wearable around a wrist 66 of a child when the strap 44 is coupled to the waist belt 12. In this way the strap 44 inhibits the child from moving away from the caregiver. The wrist belt 64 is coupled to and extends away from the secondary end 48 of the strap 44 and the wrist belt 64 has a distal end 67 with respect to the secondary end 48. The distal end 67 is extendable through the slit 54 in the strap 44 such that the wrist belt 64 forms a closed loop for retaining the strap 44 around the child's wrist 66.

A wrist mating member 68 is coupled to the wrist belt 64 and the wrist mating member 68 is positioned adjacent to the distal end 67 of the wrist belt 64. The wrist mating member 68 is matable to the secondary mating member 58 on the strap 44 when the distal end 67 is passed through the slit 54 in the strap 44. The wrist mating member 68 may comprise a hook and loop fastener, a snap or any other type of releasable, multiple use fastener. In an alternative embodiment 69 as is most clearly shown in FIG. 4, the waist belt 64 has an elastomeric portion 70 for enhancing comfort for the caregiver.

In use, the waist belt 12 is worn around the caregiver's waist 13 and the wrist belt 64 is worn around the child's wrist 66. The strap 44 is coupled to one of the connection points 14 on the waist belt 12 depending upon the caregiver's preference. In this way the child is inhibited from moving beyond the length of the strap 44 from the caregiver. Additionally, the waist belt 12 is folded such that the top edge 24 of the waist belt 12 is aligned with the bottom edge 22 of the waist belt 12 when the strap 44 is coupled to the waist belt 12. Thus, the caregiver can continuously monitor the child in a heavily populated public area, for example, or any other situation that could potentially result in the child getting lost or abducted. Additionally, the bell 60 continuously rings from motion of the child to constantly alert the caregiver that the child is still attached to the waist belt 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A child restraint assembly for inhibiting a child from moving beyond a trigger distance from a caregiver, said assembly comprising:

a waist belt being wearable around the waist of a caregiver, said waist belt having a plurality of connection points thereon being distributed along a full length of said waist belt;

a strap being matable to a respective one of said connection points on said waist belt;

a bell being coupled to said strap wherein said bell is configured to emit an audible sound when said strap is moved;

a wrist belt being coupled to said strap, said wrist being wearable around a wrist of a child when said strap is coupled to said waist belt wherein said strap is configured to inhibit the child from moving away from the caregiver;

wherein said strap has a primary end, a secondary end, a primary surface and a secondary surface, said strap having a slit extending through said primary surface and said secondary surface, said slit being positioned adjacent to said secondary end, said slit being oriented to extend along a line being oriented parallel to said secondary end;

wherein said wrist belt is coupled to and extends away from said secondary end of said strap, said wrist belt having a distal end with respect to said secondary end, said distal end being extendable through said slit in said strap such that said wrist belt forms a closed loop wherein said wrist belt is configured to be retained around the child's wrist;

a primary mating member being coupled to said strap;

a secondary mating member being coupled to said strap; and a wrist mating member being coupled to said wrist belt, said wrist mating member being positioned adjacent to said distal end of said wrist belt, said wrist mating member being matable to said secondary mating member on said strap when said distal end is passed through said slit in said strap.

2. The assembly according to claim 1, wherein said waist belt has a first end, a second end and a front surface extending therebetween, said waist belt having a bottom edge and a top edge, said first end having a first tab extending laterally away therefrom, said second end having a second tab extending laterally away therefrom, said first tab being matable to said second tab to form said waist belt into a closed loop wherein said waist belt is configured to be retained around the caregiver's waist, said first tab having a forward surface, said second tab having a rear surface.

3. The assembly according to claim 2, further comprising:
   a first mating member being coupled to said forward surface of said first tab, and
   a second mating member being coupled to said rear surface of said second tab, said first mating member releasably engaging said first mating member.

4. The assembly according to claim 2, further comprising a plurality of waist belt mating members, each of said waist belt mating members being coupled to said front surface of said waist belt, each of said waist belt mating members defining a respective one of said connection points on said waist belt, each of said waist belt mating members being positioned adjacent to said bottom edge of said belt.

5. The assembly according to claim 4, wherein said plurality of waist belt mating members includes a set of first waist belt mating members and a set of second waist belt mating members, said first waist belt mating members being distributed from said first end toward said second end, said second waist belt mating members being distributed from said second end toward said first end.

6. The assembly according to claim 1, further comprising:
   a plurality of waist mating members each being coupled to said waist belt at an associated one of the connection points; and
   a primary mating member being coupled to said primary surface of said strap, said primary mating member being matable to a respective one of said waist belt mating members for retaining said strap on said waist belt, said primary mating member being positioned adjacent to said primary end.

7. The assembly according to claim 6, further comprising a secondary mating member being coupled to said secondary surface of said strap, said secondary mating member being positioned adjacent to said slit in said strap.

8. A child restraint assembly for inhibiting a child from moving beyond a trigger distance from a caregiver, said assembly comprising:
   a waist belt being wearable around the waist of a caregiver, said waist belt having a plurality of connection points thereon being distributed along a full length of said waist belt, said waist belt having a first end, a second end and a front surface extending therebetween, said waist belt having a bottom edge and a top edge, said first end having a first tab extending laterally away therefrom, said second end having a second tab extending laterally away therefrom, said first tab being matable to said second tab to form said waist belt into a closed loop wherein said waist belt is configured to be retained around the caregiver's waist, said first tab having a forward surface, said second tab having a rear surface;
   a first mating member being coupled to said forward surface of said first tab;
   a second mating member being coupled to said rear surface of said second tab, said first mating member releasably engaging said first mating member;
   a plurality of waist belt mating members, each of said waist belt mating members being coupled to said front surface of said waist belt, each of said waist belt mating members defining a respective one of said connection points on said waist belt, each of said waist belt mating members being positioned adjacent to said bottom edge of said belt, said plurality of waist belt mating members including a set of first waist belt mating members and a set of second waist belt mating members, said first waist belt mating members being distributed from said first end toward said second end, said second waist belt mating members being distributed from said second end toward said first end;
   a strap being matable to a respective one of said connection points on said waist belt, said strap having a primary end, a secondary end, a primary surface and a secondary surface, said strap having a slit extending through said primary surface and said secondary surface, said slit being positioned adjacent to said secondary end, said slit being oriented to extend along a line being oriented parallel to said secondary end;
   a primary mating member being coupled to said primary surface of said strap, said primary mating member being matable to a respective one of said waist belt mating members for retaining said strap on said waist belt, said primary mating member being positioned adjacent to said primary end;
   a secondary mating member being coupled to said secondary surface of said strap, said secondary mating member being positioned adjacent to said slit in said strap;
   a bell being coupled to said strap wherein said bell is configured to emit an audible sound when said strap is moved;
   a wrist belt being coupled to said strap, said wrist being wearable around a wrist of a child when said strap is coupled to said waist belt wherein said strap is configured to inhibit the child from moving away from the caregiver, said wrist belt being coupled to and extending away from said secondary end of said strap, said wrist belt having a distal end with respect to said secondary end, said distal end being extendable through said slit in said strap such that said wrist belt forms a closed loop wherein said wrist belt is configured to be retained around the child's wrist; and
   a wrist mating member being coupled to said wrist belt, said wrist mating member being positioned adjacent to said distal end of said wrist belt, said wrist mating member being matable to said secondary mating member on said strap when said distal end is passed through said slit in said strap.

* * * * *